S. J. SHIMER.

CUTTER HEAD.

No. 11,617. Reissued June 29, 1897.

Witnesses:
Franck L. Orizand
Jamel H. Jone

Inventor:
Samuel J. Shimer,
by Louis Bagger & Co.
Attorneys.

THE NORRIS PETERS CO., PHOTO-LITHO., WASHINGTON, D. C.

UNITED STATES PATENT OFFICE.

SAMUEL J. SHIMER, OF MILTON, PENNSYLVANIA.

CUTTER-HEAD.

SPECIFICATION forming part of Reissued Letters Patent No. 11,617, dated June 29, 1897.

Original No. 555,742, dated March 3, 1896. Application for reissue filed February 1, 1897. Serial No. 621,580.

DIVISION B.

*To all whom it may concern:*

Be it known that I, SAMUEL J. SHIMER, a citizen of the United States, and a resident of Milton, in the county of Northumberland and State of Pennsylvania, have invented certain new and useful Improvements in Cutter-Heads; and I do hereby declare the following is a full, clear, and exact description of the invention, that will enable others skilled in the art to which it appertains to make and use the same, reference being had to the accompanying drawings, and to the figures of reference marked thereon, which form a part of this specification.

The present application is for a reissue of the Letters Patent granted to me the 3d day of March, 1896, and for which I have also filed a divisional application of even date herewith, Serial No. 621,579.

This invention relates to rotary cutter-heads for planing-machines having two or more inclined faces transversely convexed, to which plane surfacing-knives are secured in such manner as to give a shearing cut across the face of a board.

The invention consists in the novel construction and combination of parts hereinafter fully described and claimed.

Figure 1:
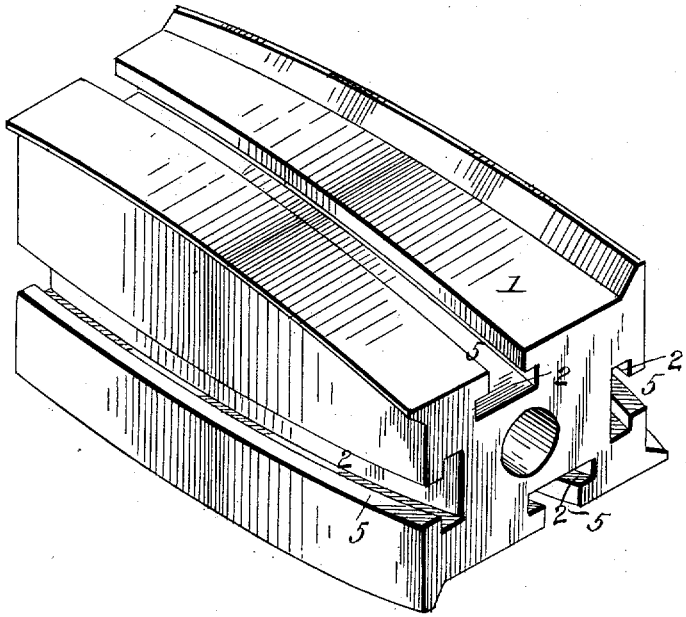
Figure 2:
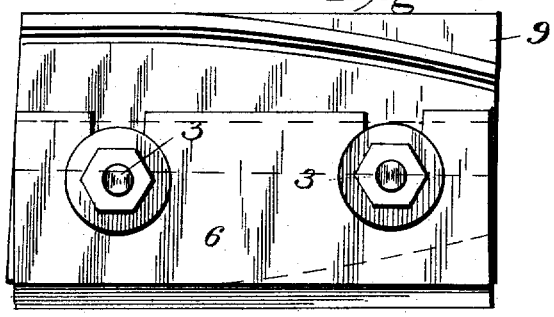

In the accompanying drawings, Figure 1 is perspective view of a cutter-head constructed in accordance with my invention, the knives being removed. Fig. 2 is a front elevation of the same, one of the knives being in place.

In the said drawings the reference-numeral 1 designates a rotary cutter-head having a central aperture for the mandrel by which it is rotated. The cutter-head, as illustrated, has four trapezoidal sides or faces alternately arranged and inclining inward and outward of the axial line of the head and made convex or in the form of a segment of an ellipse in longitudinal section—that is to say, two opposite sides of the head are inclined on a curved line from end to end of the head, while the other faces or sides are inversely inclined on a correspondingly-curved line, or, slanting from the same end of the head, they incline toward the axial line of the head. Each of the sides or faces is formed with a T or channel groove 2, in which are seated the angular heads of screw-bolts 3. These bolts pass through slots 5 in flat knives 6 with straight cutting edges, which knives are sprung down and bolted upon the head, assuming a concavo-convex shape, and the cutting edges taking a convex form, so that the entire cutting edge will be within a cylinder of rotation, whereby they will cut chips diagonally in opposite directions from side to side across a plane board. By this construction an ordinary planer-knife with a straight cutting edge may be employed, as the convexity of the sides or faces of the head determines the convexity of the cutting edge, whereas in a cutter-head having flat sides, as in the divisional application filed herewith, Serial No. 621,579, the cutting edge of the knife has to be ground to the required convexity before being applied to the head.

From the above it will be seen that the opposite faces are convexed longitudinally on the arc of a symmetrically-disposed ellipse, while said faces on the transverse lines are straight and parallel with each other—that is to say, if a section be taken longitudinally through the head the outlines of said faces will appear as curved on a symmetrically-disposed ellipse and converging toward one end, while if a transverse section be taken at any point between the ends of the head the outlines will form a quadrangular polygon.

In Fig. 2 the parallel dotted lines near the center of the head represent the axial opening or aperture to receive the shaft or mandrel, while the single dotted line at the lower side indicates the elliptical face symmetrically disposed with the upper elliptical face with respect to the dotted lines representing the shaft or mandrel aperture or opening.

It is obvious that instead of forming the head with four sides it may have two opposite sides, oppositely inclined with respect to the axial line, and two knives only be employed. In this case the knives would produce a shearing cut from opposite sides of the board, the cuts made by both knives being in the same direction.

I do not claim herein any matter shown and described in said divisional application, Serial No. 621,579, and specifically claimed therein.

Having thus fully described my invention, what I claim is—

1. As an improved article a cutter-head having two opposite sides inclined longitudinally with respect to the axial line thereof, and convexed longitudinally on the arc of a symmetrically-disposed ellipse, and the transverse lines being straight and parallel with each other, and the convexity of said faces being so proportioned with respect to the radius of the cylinder of rotation that the forward edges of said faces will lie in the surface of the cylinder of rotation, substantially as described.

2. As an improved article a cutter-head having four trapezoidal sides or faces alternately arranged and alternately inclined inward and outward with respect to the axial line of the head, and the opposite faces convexed longitudinally on the arc of a symmetrically-disposed ellipse and converging toward one end and the transverse lines of said faces being straight, and said convexity being so proportioned with respect to the radius of the cylinder of rotation that the forward edge of said faces will lie on the surface of the cylinder of rotation, substantially as described.

3. The combination with a cutter-head having four trapezoidal sides or faces alternately arranged and alternately inclined inward and outward with respect to the axial line of the head, and the opposite faces convexed longitudinally on the arc of a symmetrically-disposed ellipse, and converging toward each other at one end, and the transverse lines of the opposite faces being straight, of the flat knives having straight cutting edges, sprung down and bolted on said faces, the convexity of the faces being so proportioned with respect to the radius of a cylinder of rotation, that the edges of the knives will lie on the surface of the cylinder of rotation, substantially as described.

In testimony whereof I affix my signature in presence of two witnesses.

SAMUEL J. SHIMER.

Witnesses:

JOS. ANGSTADT,

BENNETT S. JONES.